(12) United States Patent
An et al.

(10) Patent No.: US 7,838,140 B2
(45) Date of Patent: Nov. 23, 2010

(54) STACK AND FUEL CELL SYSTEM HAVING THE SAME

(75) Inventors: Jin-Hong An, Suwon-si (KR); Yun-Suk Choi, Suwon-si (KR); Ri-A Ju, Suwon-si (KR); Dong-Yun Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1482 days.

(21) Appl. No.: 11/218,791

(22) Filed: Sep. 2, 2005

(65) Prior Publication Data

US 2006/0068252 A1   Mar. 30, 2006

(30) Foreign Application Priority Data

Sep. 24, 2004   (KR) .................. 10-2004-0077058

(51) Int. Cl.
*H01M 8/04*   (2006.01)
(52) U.S. Cl. .......................... 429/34; 429/36
(58) Field of Classification Search .................. 429/12, 429/13, 34, 36, 38, 26, 457
See application file for complete search history.

(56) References Cited

U.S. PATENT DOCUMENTS 6,372,373 B1   4/2002   Gyoten et al.
2004/0247986 A1 *  12/2004   Takeguchi et al. ............. 429/38

FOREIGN PATENT DOCUMENTS

| CN | 1233081 A | 10/1999 |
|---|---|---|
| CN | 1519969 A | 8/2004 |
| EP | 1 439 593 A2 | 7/2004 |
| JP | 11-250923 A | 9/1999 |
| JP | 2001-52723 A | 2/2001 |
| JP | 2002-298872 A | 10/2002 |
| JP | 2004-158435 A | 6/2004 |
| JP | 2004-247289 A | 9/2004 |
| KR | 1999-0083281 | 11/1999 |
| WO | WO 2004/075326 A1 | 9/2004 |

* cited by examiner

*Primary Examiner*—Jennifer Mlchener
*Assistant Examiner*—Monique Wills
(74) *Attorney, Agent, or Firm*—Christie, Parker & Hale, LLP

(57) ABSTRACT

A fuel cell system comprising a stack including at least one electricity generator for generating electric energy through a reaction between fuel and oxygen, a fuel supply unit for supplying the fuel to the electricity generator, and an oxygen supply unit for supplying the oxygen to the electricity generator is provided. The electricity generator includes a membrane-electrode assembly and separators which have a plurality of flow channels for passing fuel and oxygen and which are placed on both surfaces of the membrane-electrode assembly. The separators include a connecting portion with a straight part between rounded corners for coupling the flow channels at their ends. The connecting portion minimizes turbulence in the flow while maintaining sufficient effective area for contact between the fuel and oxygen with the active area of the membrane-electrode assembly.

14 Claims, 7 Drawing Sheets

STACK AND FUEL CELL SYSTEM HAVING THE SAME

CROSS REFERENCE TO RELATED APPLICATION

This application claims priority to and the benefit of Korean Patent Application No. 10-2004-0077058 filed in the Korean Intellectual Property Office on Sep. 24, 2004, the entire content of which is incorporated herein by reference.

FIELD OF THE INVENTION

The present invention relates to a fuel cell system and more particularly to a separator of a stack used in a fuel cell system.

BACKGROUND OF THE INVENTION

A fuel cell system is an electricity generating system that converts chemical reaction energy of oxygen and hydrogen contained in hydrocarbon fuels, such as methanol, ethanol, or natural gas, into electric energy.

Fuel cell systems include polymer electrolyte membrane fuel cells (PEMFC) and direct oxidation fuel cells among other types. Fuel cell systems employing the PEMFC scheme include a stack which comprises the body of the fuel cell, a reformer for reforming the fuel to generate hydrogen and for supplying the hydrogen to the stack, and an air pump or a fan for supplying oxygen to the stack. The stack generates a predetermined amount of electric energy through a reaction between hydrogen supplied from the reformer and oxygen supplied through the air pump or the fan. In a fuel cell system employing the direct oxidation fuel cell scheme, the fuel is directly supplied to the stack to generate electric energy through an electrochemical reaction of the fuel and oxygen. The direct oxidation fuel cell system does not require a reformer.

In the fuel cell systems described above, the stack includes several to several tens of unit cells stacked next to one another. Each unit cell has a membrane-electrode assembly (MEA) and separators closely located on both surfaces of the MEA.

The separators are provided with a first passage for supplying hydrogen or fuel to the MEA and a second passage for supplying oxygen to the MEA. The first and second passages are formed as channels on the surfaces of the separators. The channels are formed between a plurality of ribs arranged along straight lines and the ends of the channels are alternately connected together creating a continuous path. The ends of the channels are connected through connecting portions.

In a conventional stack, turbulence forms at the corners of the connecting portions which are rectangular and creates a resistance to the flow of hydrogen or fuel and oxygen. Accordingly, in conventional stacks, rectangular corners of the connecting portions between the ends of the channels hinder the flow of hydrogen or fuel and oxygen by creating turbulence and disrupting a smooth laminar flow.

SUMMARY OF THE INVENTION

The present invention provides a stack for a fuel cell system with an improved channel structure for a separator in order to obtain smooth flow of hydrogen or fuel and oxygen and a fuel cell system including the stack.

According to one embodiment of the present invention, a stack for a fuel cell system including at least one electricity generator is presented. The electricity generator includes a MEA and separators which have a plurality of flow channels for passing fuel and oxygen and are located close to both surfaces of the MEA. The separators include a connecting portion coupling the flow channels. The corners of the connecting portion have a rounded shape and circular arcs forming the rounded corners of the connecting portion may have a radius of curvature ranging from 1.0 mm to 2.12 mm. The flow channels may have a bottom portion and a pair of wall portions extending from the bottom portion. The connecting portion may have a first portion coupled to one wall portion and a second portion coupled to the other wall portion. The corners of the first portion may be formed in a rounded shape. The corners of the second portion may be formed also in a rounded shape. The length of the circular arcs forming the corners of the first portion may be greater than the length of the circular arcs forming the corners of the second portion. In the connecting portion, a wall portion extending from the corners of the first portion may be formed in a straight shape. In the connecting portion, a wall portion extending from the corners of the second portion may be formed in a straight shape. The circular arcs forming the corners of the first portion may have a radius of curvature ranging 1.0 mm to 2.12 mm. The circular arcs forming the corners of the second portion may have a radius of curvature ranging 1.0 mm to 2.12 mm.

The separators may be located close to one surface of the MEA to form a fuel passage with their flow channels and the separators may be located close to the other surface of the MEA to form an air passage with their flow channels. The stack may include a plurality of the electricity generators successively located.

According to another embodiment of the present invention, a fuel cell system including a stack including at least one electricity generator generating electric energy through a reaction between fuel and oxygen, a fuel supply unit for supplying the fuel to the electricity generator, and an oxygen supply unit for supplying the oxygen to the electricity generator is presented. The electricity generator includes a MEA and separators which have a plurality of flow channels for passing fuel and oxygen and are located close to both surfaces of the MEA. The separators include a connecting portion coupling the flow channels. The corners of the connecting portion are formed in a rounded shape and circular arcs forming the corners may have a radius of curvature ranging 1.0 mm to 2.12 mm. The flow channels may have a bottom portion and a pair of wall portions extending from the bottom portion and the connecting portion may have a first portion coupled to one wall portion and a second portion coupled to the other wall portion. The corners of the first portion may be formed in a rounded shape. The corners of the second portion may be formed in a rounded shape. In the connecting portion, a wall portion extending from the corners of the first portion may be formed in a straight shape. In the connecting portion, a wall portion extending from the corners of the second portion may be formed in a straight shape. Hydrogen gas may be used as the fuel. The fuel may be liquid. The oxygen used may be obtained from air.

According to the embodiments of the invention, by improving the structure of the connecting portions coupling the channels of the separators at their ends, it is possible to prevent turbulence in the flow through the passages of the separators. The flow rate of fuel and air passing through the fuel and air passages are increased and the non-uniformity caused by turbulence is decreased. This allows uniform delivery of fuel and oxygen to the active region of the MEA. As a result, uniform reaction efficiency over the active region of the MEA is achieved and the performance of the fuel cell system is improved.

DETAILED DESCRIPTION

Figure 1:
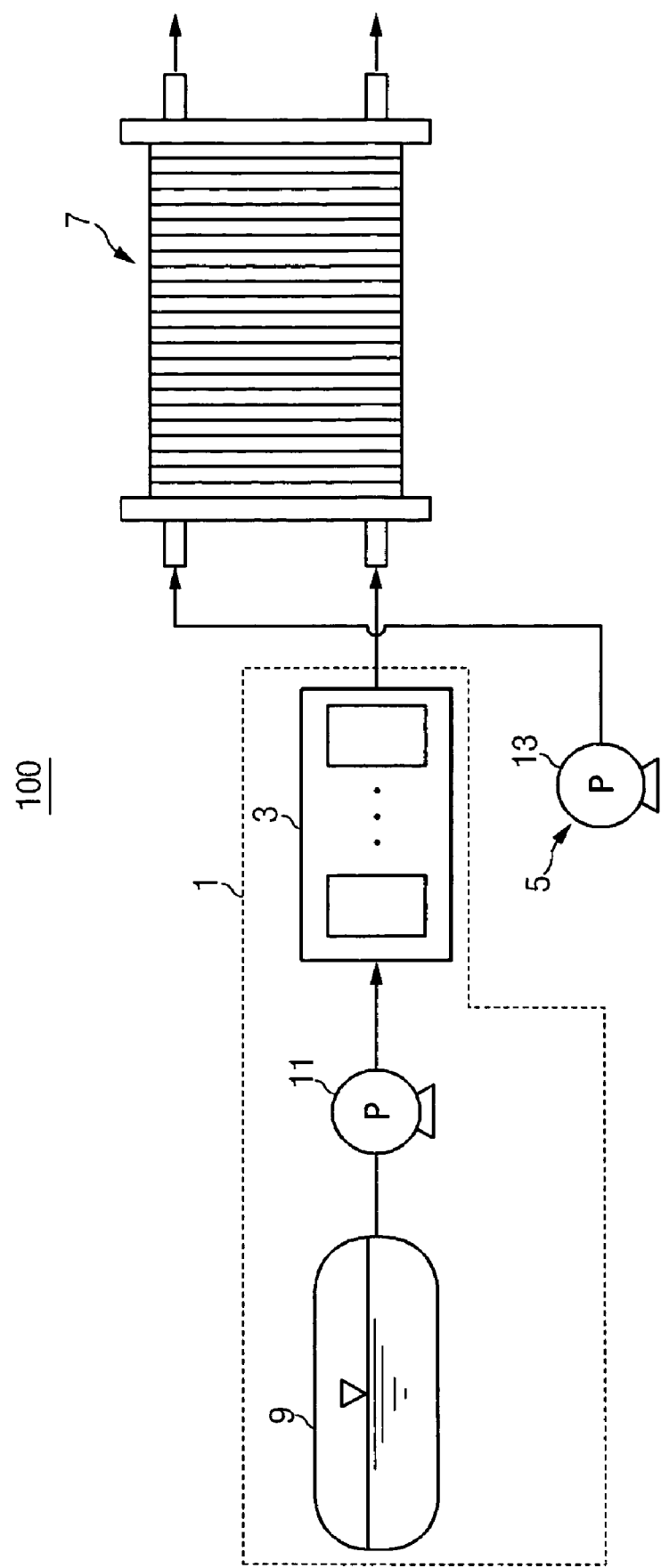
FIG. 1 is a block diagram of a fuel cell system according to one embodiment of the present invention.

FIG. 1 is a block diagram of a fuel cell system 100 according to an embodiment of the present invention. The fuel cell system 100 is constructed according to a PEMFC scheme, which reforms fuel to generate hydrogen and allows hydrogen and oxygen to electrochemically react with each other to generate electric energy.

The fuel used in the fuel cell system 100 may include liquid fuel or gas fuel. The fuel may be a hydrogen containing material such as methanol, ethanol, or natural gas. In the following written description, a liquid fuel is the example used for convenience. The fuel cell system 100 may utilize pure oxygen stored in an additional storage device as the oxygen reacting with the hydrogen or it may use oxygen-containing air. The latter is the example used in the following description.

The fuel cell system 100 includes a stack 7 generating electric energy through an electrochemical reaction between hydrogen and oxygen, a fuel supply unit 1 generating hydrogen from fuel and supplying the hydrogen to the stack 7, and an oxygen supply unit 5 supplying oxygen to the stack 7.

The stack 7 includes at least one fuel cell which is coupled to the fuel supply unit 1 and the oxygen supply unit 5. The stack 7 is supplied with hydrogen from the fuel supply unit 1 and air from the oxygen supply unit 5 and generates electric energy from the reaction between hydrogen and oxygen.

The fuel supply unit 1 includes a fuel tank 9 for storing fuel, a fuel pump 11 for discharging the fuel from the fuel tank 9, and a reformer 3. The reformer 3 is supplied with the fuel from the fuel tank 9, reforms the fuel to generate hydrogen, and supplies the hydrogen to the stack 7.

The reformer 3 has a conventional structure which generates the hydrogen from the fuel through a chemical catalytic reaction using thermal energy and reduces the concentration of carbon monoxide contained in the hydrogen. The reformer 3 generates the hydrogen from the fuel through a catalytic reaction of the fuel such as a steam reforming reaction, a partial oxidation reaction, or an auto-thermal reaction. In addition, the reformer 3 reduces the concentration of carbon monoxide contained in the hydrogen through a water-gas shift reaction of the hydrogen, a preferential CO oxidation reaction, purification of the hydrogen using a separating membrane, or the like.

The oxygen supply unit 5 includes at least one air pump 13 for drawing air with a predetermined pumping power and for supplying the air to the stack 7. The oxygen supply unit 5 is not limited to the air pump 13 and may include other devices such as a conventional fan.

Alternatively, the fuel cell system 100 of the present invention may employ a direct oxidation fuel cell scheme which supplies fuel directly to the stack 7 and generates electric energy through an electrochemical reaction between the fuel and oxygen. Unlike the fuel cell system employing the PEMFC scheme, a fuel cell system employing the direct oxidation fuel cell scheme does not require the reformer 3. Instead, the fuel supply unit 1 supplies the fuel stored in the fuel tank 9 directly to the stack by means of the fuel pump 11. The fuel cell system 100 employing the PEMFC scheme is the example used in the following description while the present invention is not necessarily limited to this scheme.

Figure 2:
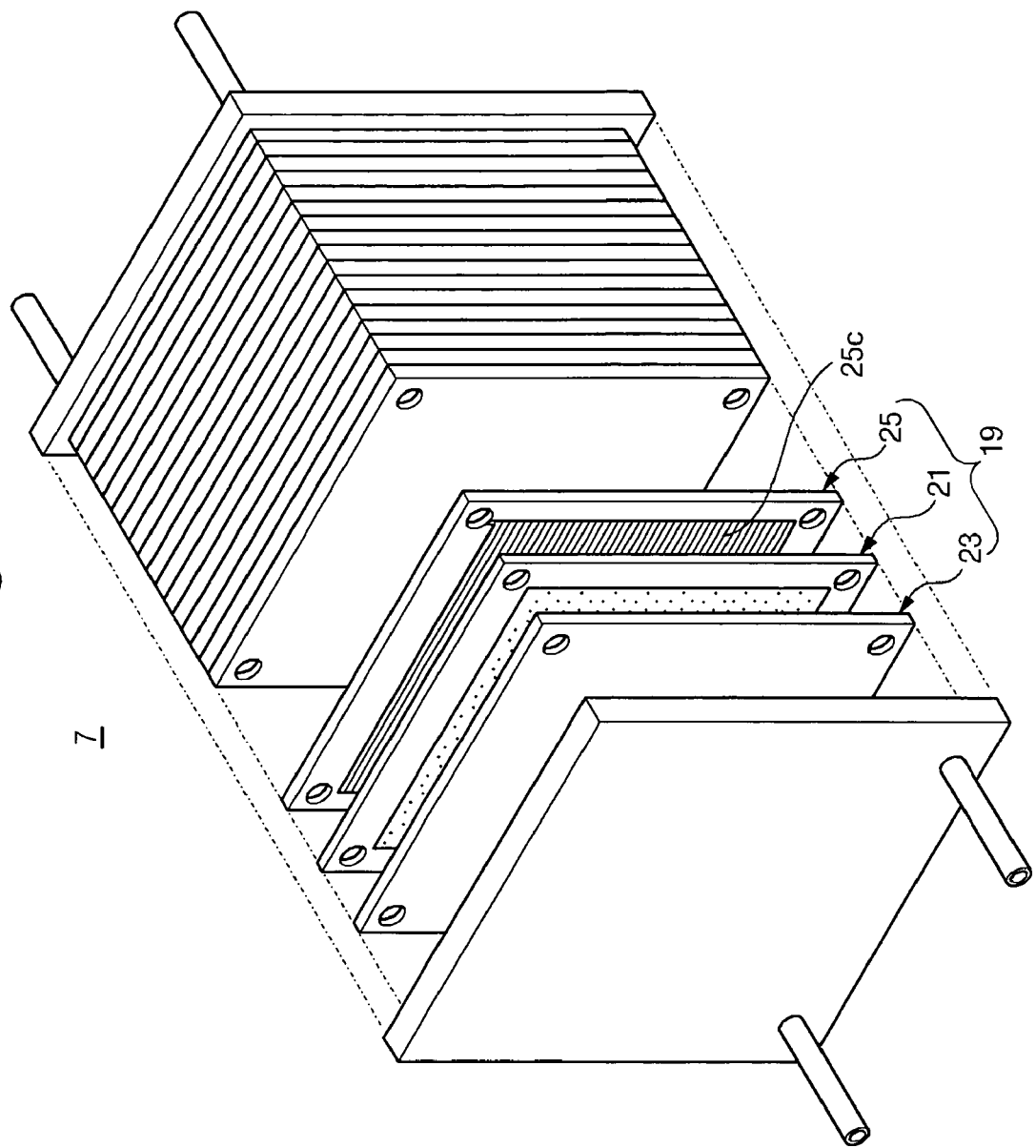
FIG. 2 is an exploded perspective view of a stack according to a first embodiment of the present invention.
Figure 3:
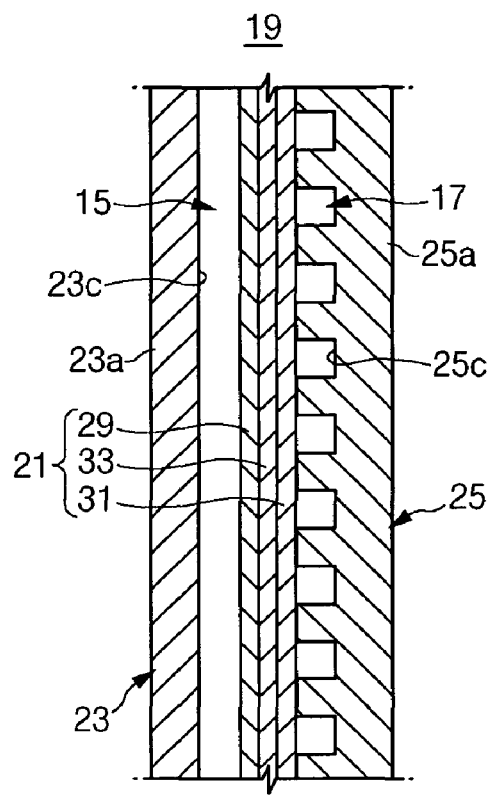
FIG. 3 is a cross-sectional view of an electricity generator shown in FIG. 2.
Figure 4:
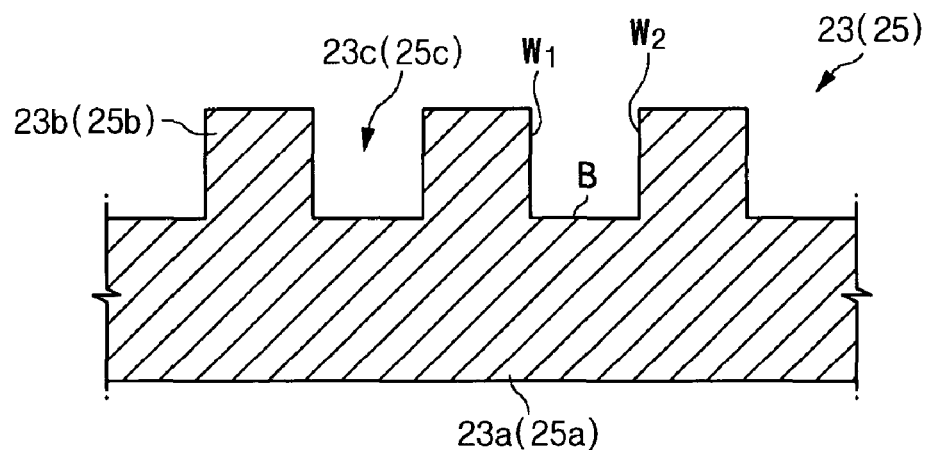
FIG. 4 is an enlarged cross-sectional view of a part of a separator shown in FIG. 3.

FIG. 2 is an exploded perspective view of the stack 7 according to a first embodiment of the present invention. FIG. 3 is a cross-sectional view of an electricity generator 19 shown in FIG. 2. FIG. 4 is an enlarged cross-sectional view of a part of a separator 23, 25 shown in FIG. 3.

The stack 7 includes a fuel cell or a unit electricity generator 19 generating electric energy through the reaction between hydrogen and oxygen. In the unit electricity generator 19, separators 23, 25 are located on both surfaces of a MEA 21. The separators 23, 25 are also referred to as "bipolar plates" in the art. The stack 7 can be formed as a set of the electricity generators 19 by stacking a plurality of unit electricity generators 19 next to one another.

The MEA 21 is located between the separators 23, 25 and includes an anode 29 formed on one surface, a cathode 31 formed on the other surface, and an electrolyte membrane 33 formed between the anode and the cathode 29, 31. The anode 29 decomposes hydrogen into hydrogen ions and electrons. The electrolyte membrane 33 moves hydrogen ions to the cathode 31. The cathode 31 generates moisture through the reaction of the electrons and hydrogen ions from the anode 29 and oxygen contained in air.

The separators 23, 25 function as a conductor which is located closely adjacent to both surfaces of the MEA 21 and couples the anode 29 and the cathode 31 of the MEA 21 together in series. The separators 23, 25 also function as hydrogen and air passages for supplying the hydrogen to the anode 29 of the MEA 21 and supplying the air to the cathode 31.

One of the separators 23 is located adjacent the anode 29 of the MEA 21 to form a hydrogen passage 15 for supplying the hydrogen to the anode 29. The other separator 25 is located adjacent the cathode 31 of the MEA 21 to form an air passage 17 for supplying the air to the cathode 31. When both separators 23, 25 are located adjacent to the two surfaces of the MEA 21, the hydrogen passage 15 positioned on the anode 29 side of the MEA 21 appears vertical in the figure and the air passage 17 appears horizontal. That is, in the example shown, the hydrogen passage 15 and the air passage 17 are located perpendicular to each other. Alternatively, the hydrogen passage 15 and the air passage 17 may be located parallel to each other and their relative locations are not limited to the structure shown.

The hydrogen passage 15 can be formed by a hydrogen flow channel 23c formed on the surface of the separator 23 contacting the MEA 21. The air passage 17 can be formed by an air flow channel 25c formed on the surface of the separator 25 contacting the MEA 21. The hydrogen and air flow channels 23c, 25c can be formed as spaces between ribs 23b, 25b which protrude at predetermined intervals from a body 23a, 25a of the separators 23, 25, as shown in FIG. 4. The flow channels 23c, 25c include a bottom portion B and a pair of wall portions W1 and W2 extending from the bottom portion B. The wall portions W1 and W2 indicate both side wall portions of the ribs 23b, 25b.

Figure 5:
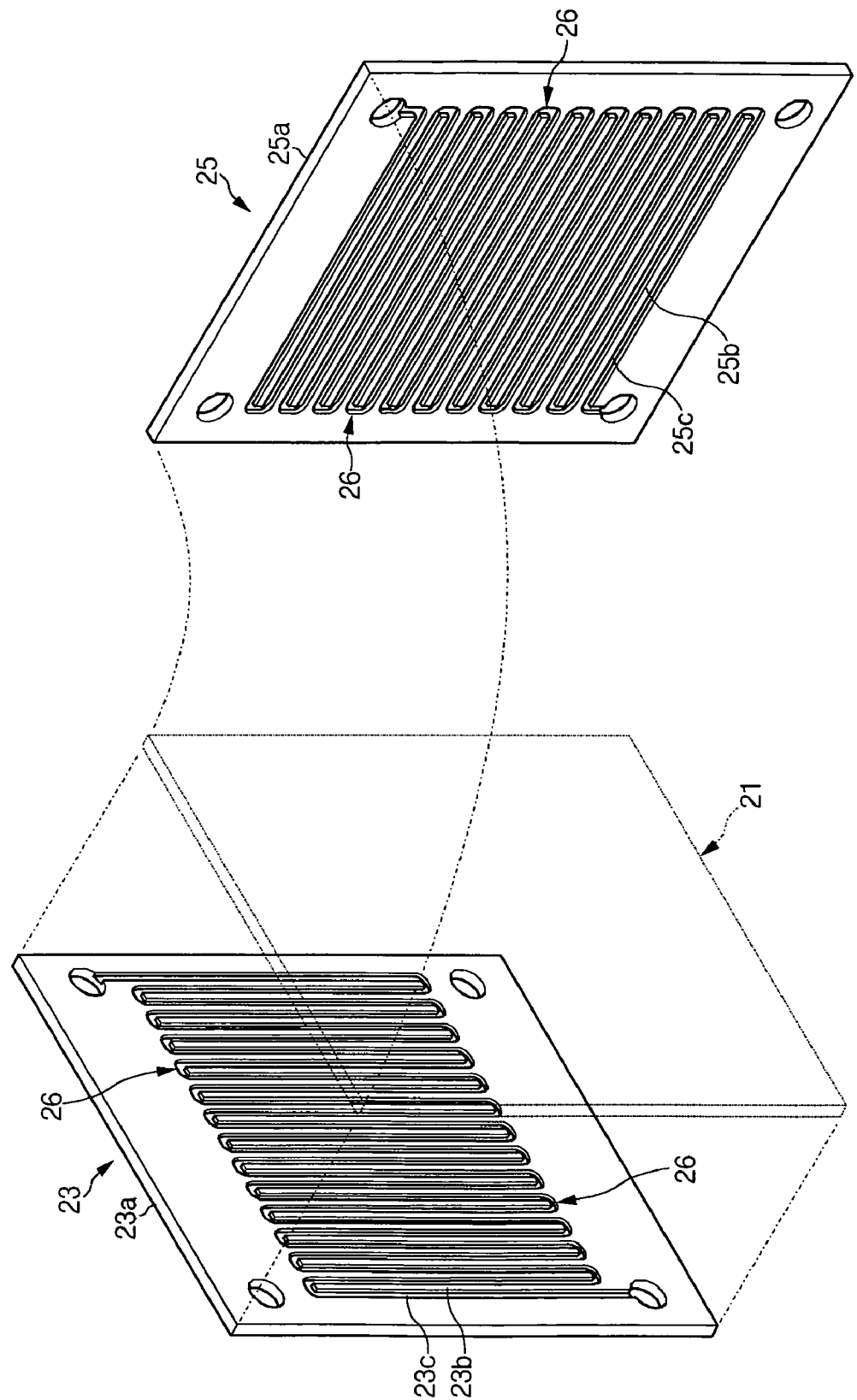
FIG. 5 is an exploded perspective view illustrating the separator of the first embodiment shown in FIG. 3.
Figure 6:
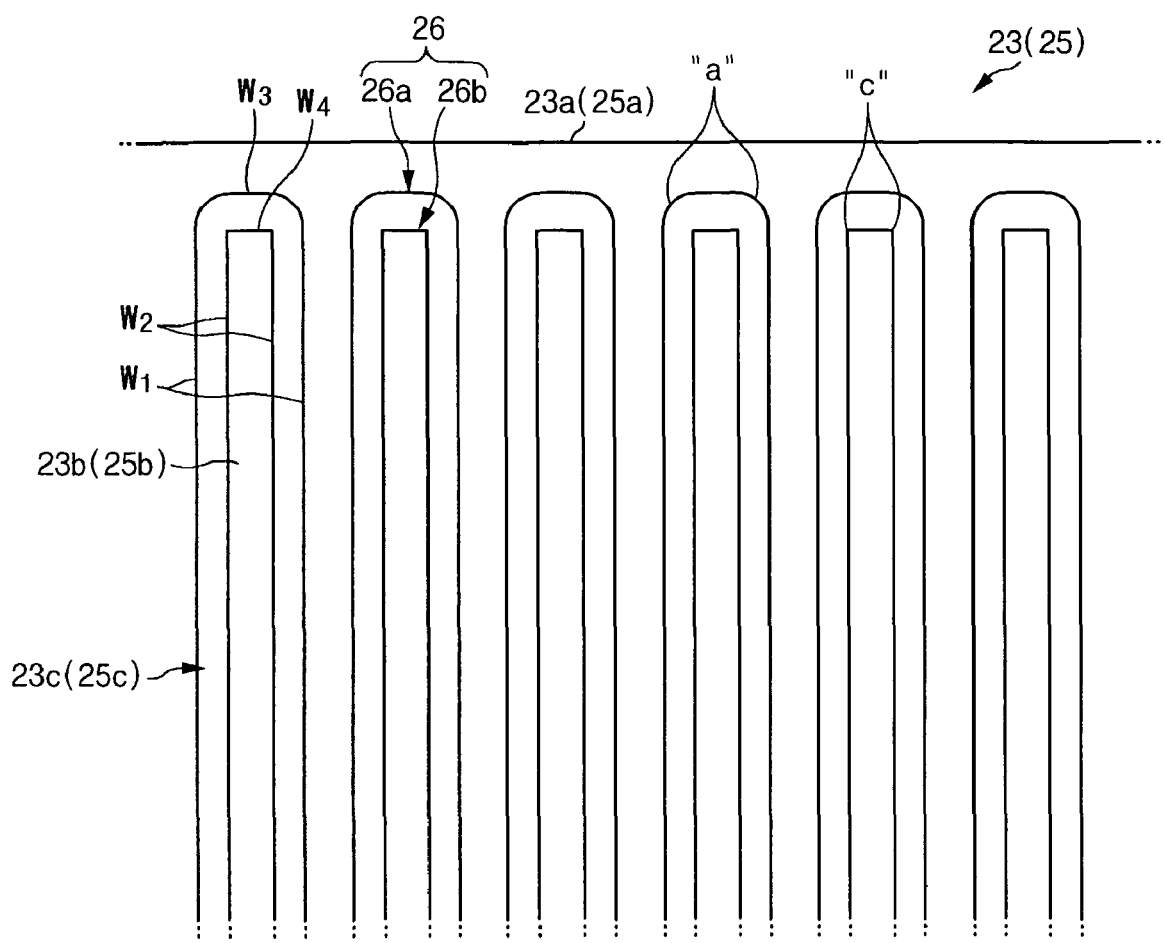
FIG. 6 is a partial plan view of the separator shown in FIG. 5.

FIG. 5 is an exploded perspective view of the separators 23, 25 of the first embodiment of the present invention. FIG. 6 is a partial plan view of the separators 23, 25 shown in FIG. 5.

In the electricity generator 19 of the stack 7 for a fuel cell system according to the first embodiment, the separators 23, 25 include connecting portions 26 which couple ends of the hydrogen and air flow channels 23c, 25c and have rounded corners. The connecting portions 26 are formed or placed at the ends of the flow channels 23c, 25c to alternately couple these channel ends together.

Accordingly, because the separators 23, 25 are placed close to both surfaces of the MEA 21 and have the connecting portions 26 alternately coupling the ends of the flow channels 23c, 25c, the hydrogen passage 15 (FIG. 3) and the air passage 17 (FIG. 3) can form continuous hydrogen and air paths as shown in FIG. 5.

Specifically, each connecting portion 26 includes a first portion 26a coupled to one wall portion W1 of the hydrogen or air flow channels 23c, 25c shown in FIG. 6 and a second portion 26b coupled to the other wall portion W2 of the flow channel 23c, 25c. When a pair of flow channels 23c, 25c are located adjacent to each other, one wall portion W1 of each flow channel 23c, 25c in the pair will be one of two outer walls for the pair, and the other wall portion W2 of each flow channel 23c, 25c will be one of two inners walls for the pair of flow channels 23c, 25c. The first portion 26a is coupled to the outer wall portions W1 of the flow channels 23c, 25c in the adjacent pair and the second portion 26b is coupled to the inner wall portions W2 of the flow channels 23c, 25c in the adjacent pair of channels.

According to the first embodiment, the first portion 26a of each connecting portion 26 has a pair of corners "a" coupled to the outer wall portions W1 of the flow channel 23c, 25c and a third wall portion W3 coupling the corners "a", where the corners "a" are curved or formed with a rounded shape while the third wall portion W3 is straight. The second portion 26b of each connecting portion 26 has a pair of corners "c" coupled to the inner wall portions W2 of the flow channels 23c, 25c and a fourth wall portion W4 coupling the corners "c", where the corners "c" are rectangular while the fourth wall portion W4 is straight.

Each corner "a" of first portion 26a forms a circular arc extending from the third wall portion W3 of the first portion 26a and has a radius of curvature ranging from about 1.0 mm to about 2.12 mm. When the radius of curvature of the corners "a" is less than 1.0 mm, turbulence is generated in the flow at the corners "a". When the radius of curvature is greater than 2.12 mm, the contact area of the hydrogen and the air flowing in the active region of the MEA 21 is reduced.

Turbulence occurs in the flow at the corners "a" of the connecting portions 26 where the direction of flow of the hydrogen and the air changes. This turbulence causes resistance to the flow of the hydrogen and the air passing through the hydrogen passage 15 (FIG. 3) and the air passage 17 (FIG. 3). In the stack 7 for a fuel cell system according to the first embodiment, because the first portion 26a of the connecting portions 26 coupling the ends of the hydrogen or air flow channel 23c, 25c in the separators 23, 25 has the rounded corners "a", turbulence is reduced. Accordingly, the separators 23, 25 accomplish a smooth flow of the hydrogen and the air through the hydrogen passage 15 and the air passage 17.

In each connecting portion 26 of the first embodiment, the third and fourth wall portions W3, W4 extending from the corners "a" and "c" of the first and second portions 26a, 26b are formed along straight lines. A comparative system, in which the third and fourth wall portions W3, W4 of the connecting portion 26 were rounded, was prepared and compared with the first embodiment of the present invention. In the comparative system, because the effective area of the region corresponding to the space between the third and fourth wall portions W3, W4 was reduced, the contact area of the hydrogen and the air with the active region of the MEA 21 was also reduced. The decrease in contact area of the hydrogen and the air with the connecting portions 26 deteriorated the performance of the stack.

In the first embodiment, however, because the third and fourth wall portions W3, W4 extending from the corners "a" and "c" of the first and second portions 26a, 26b are straight, the effective area of the region corresponding to the space between the third and fourth wall portions W3, W4 is increased. Accordingly, the contact area of the hydrogen and the air with the active region of the MEA 21 is increased. The increase in contact area of the hydrogen and the air with the connecting portions 26 improves the performance of the stack.

At the time of starting up the fuel cell system 100, the hydrogen generated from the reformer 2 is supplied to the hydrogen passage 15 of each electricity generator 19 and the air pump 13 supplies the air to the air passage 17. Therefore, according to the first embodiment, when the hydrogen and the air flow through the hydrogen passage 15 and the air passage 17 with a predetermined pressure, turbulence is not generated in their flow at the corners "a" of the first portion 26a of the connecting portion 26. This is because the corners "a" are rounded.

As a result, while flowing through the hydrogen passage 15 and the air passage 17, the hydrogen and the air can smoothly pass through the corners "a" without getting caught in turbulence.

The hydrogen is supplied to the anode 29 of the MEA 21 through the hydrogen passage 15 and the air is supplied to the cathode 31 of the MEA 21 through the air passage 17. The anode 29 decomposes the hydrogen into electrons and hydrogen ions (protons) through an oxidation reaction of the hydrogen. The hydrogen ions move to the cathode 31 through the electrolyte membrane 33 and the electrons move to the cathode 31 of the neighboring MEA 21 through the separators 23, 25, but not through the electrolyte membrane 33. The flow of electrons generates a predetermined amount of current. The cathode 31 of the MEA 21 generates heat and moisture through a reduction reaction of the hydrogen ions moving from the anode 29 and the oxygen contained in the air.

Figure 7:
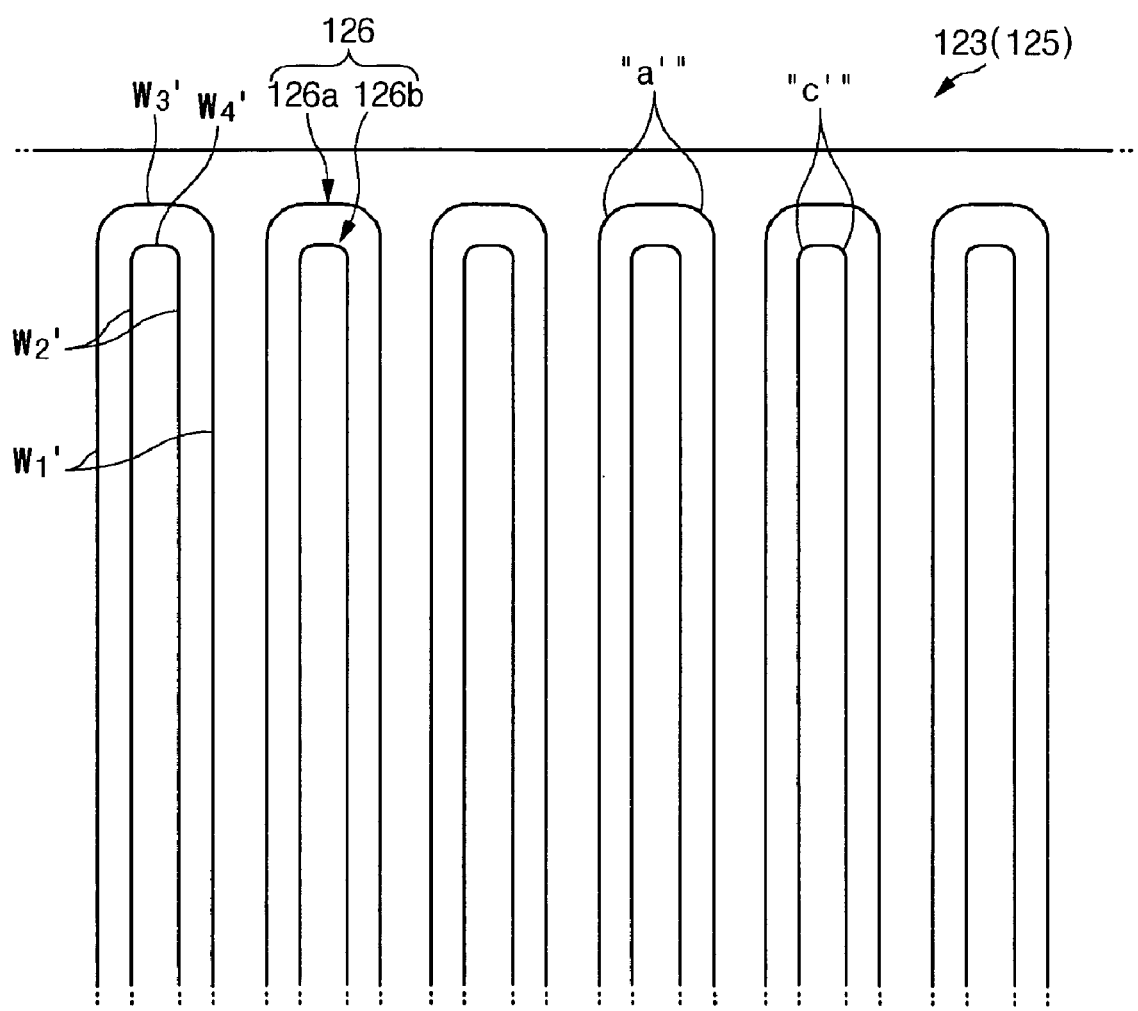
FIG. 7 is a partial plan view illustrating a separator according to a second embodiment of the present invention.

FIG. 7 is a partial plan view illustrating a separator 123, 125 according to a second embodiment of the present invention. Each separator 123, 125 has the same basic structure as that of the first embodiment separator 23, 25. However, a connecting portion 126 of the second embodiment separator 123, 125 has rounded corners "c'" in a second portion 126b, in addition to rounded corners "a'" in a first portion 126a. In other words, in the second embodiment, the corners formed where the connecting portion 126 couples to inner walls W'2 are also rounded.

The corners "a'" and "c'" of the first and second portions 126a, 126b form concentric circular arcs with a radius of curvature ranging from about 1.0 mm to about 2.12 mm. The length of the circular arc constituting the corners "a'" of the first portion 126a is greater than the length of the circular arc constituting the corners "c'" of the second portion 126b.

In the second embodiment, when the radius of curvature of the corners "a'" and "c'" is less than 1.0 mm, turbulence is generated in the flow of the hydrogen and the air is at the corners "a'", "c'". When the radius of curvature is greater than 2.12 mm, the contact area of the hydrogen and the air with the active region of the MEA 21 is reduced.

According to the second embodiment, the connecting portions 126 can be constructed such that third and fourth wall portions W'3, W'4 extending from the corners "a'" and "c'" of the first and second portions 126a, 126b, respectively, are formed in a straight line. Due to the structure of the connecting portions 126, the effective area corresponding to the space between the third and fourth wall portions W'3, W'4 is increased.

Figure 8:
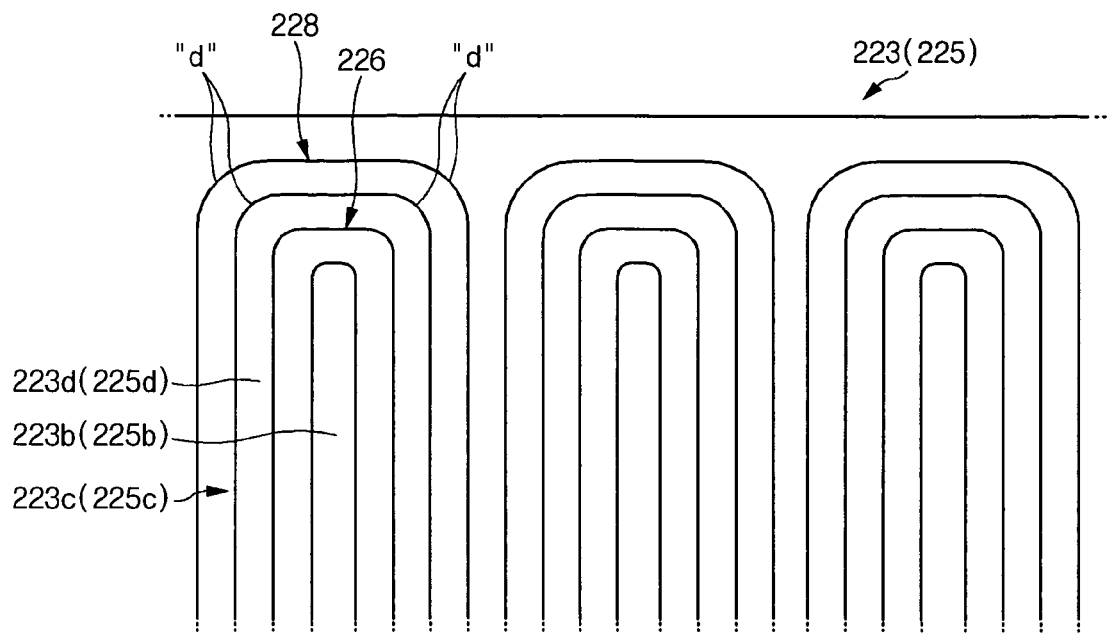
FIG. 8 is a partial plan view illustrating a separator according to a third embodiment of the present invention.

FIG. 8 is a partial plan view of a separator 223, 225 according to a third embodiment of the present invention. The separators 223, 225 of the third embodiment, can further include at least one second connecting portion 228 which is located outside a first connecting portion 226. The first connecting portion 226 corresponds to the connecting portion 26 of the first embodiment or connecting portion 126 of the second embodiment. For convenience, the first connecting portion 226 is shown with the same structure as that of the connecting portion 126 of the second embodiment.

According to the third embodiment, the second connecting portion 228 is formed at both ends of the flow channel 223c, 225c to alternately connect the ends of a pair of second ribs 223d, 225d, constituting the first connecting portion 226, which are positioned on both sides of the first rib 223b, 225b. In the example shown, only one second connecting portion 228 is formed outside the first connecting portion 226, while a plurality of second connecting portions 228 may be formed outside the first connecting portion 226. The second connecting portion 228 couples one wall portion and the other wall portion of the flow channel 223c, 225c. Corners "d" of the second connecting portion 228 are formed in a rounded circular arc having the same radius of curvature as the first and second embodiments. In addition, the wall portions extending from the corners "d" are straight.

Because operations of the separators 223, 225 of the third embodiment are similar to the first and second embodiments, detailed description of the operations is omitted.

Figure 9:
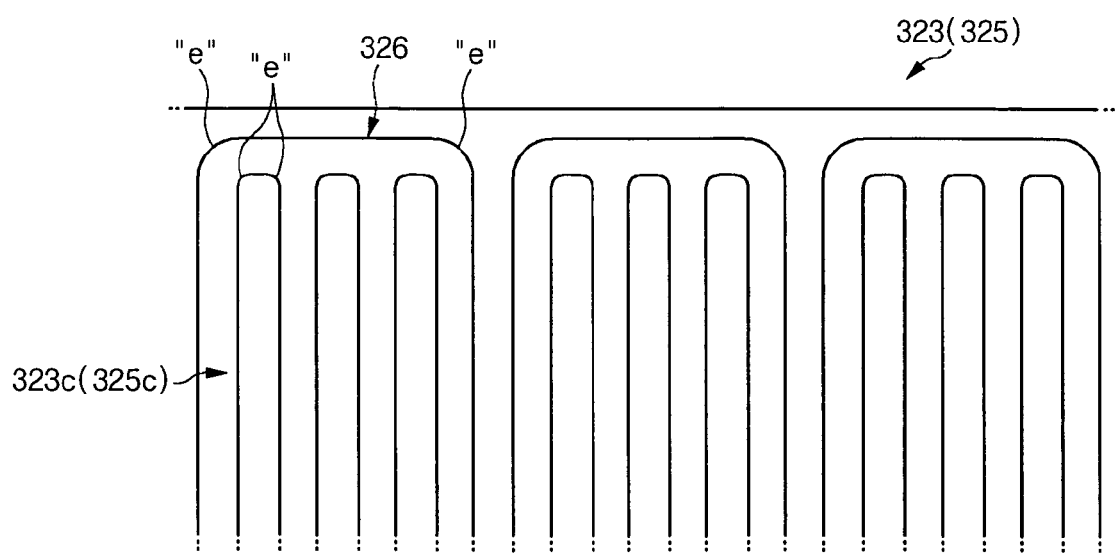
FIG. 9 is a partial plan view illustrating a separator according to a fourth embodiment of the present invention.

FIG. 9 is a partial plan view of a separator 323, 325 according to a fourth embodiment of the present invention. The separators 323, 325 may include a straight connecting portion 326, coupling the ends of at least three flow channels 323c, 325c. Corners "e" of the connecting portion 326 where the flow of the hydrogen and the air changes direction are circular arcs having the same radius of curvature as the first to third embodiments. The portions extending from the corners "e" of the connecting portion 326 between every two adjacent flow channels 323c, 325c are also straight.

Because operations of the separators 323, 325 according to the fourth embodiment are similar to the first, second, and third embodiments, detailed description of the operations is omitted.

Only exemplary embodiments of the present invention have been described and the present invention is not limited to the embodiments described, but may be modified in various forms without departing from the scope of the detailed description, the accompanying drawings, and the appended claims. Therefore, such modifications also belong to the scope of the present invention.

What is claimed is:

1. A stack for a fuel cell system including at least one electricity generator, the electricity generator having a membrane-electrode assembly and two separators closely contacting the membrane-electrode assembly on two sides, each separator comprising:
    a plurality of flow channels adapted for passing fluids; and
    a plurality of connecting portions coupling the flow channels, each connecting portion having a straight portion between rounded corners,
    wherein the flow channels end in channel ends,
    wherein the channel ends of a pair of adjacent flow channels include two adjacent walls and two apart walls,
    wherein the channel ends of the pair of adjacent flow channels are coupled together by one of the connecting portions defining an inner connection profile between the two adjacent walls and an outer connection profile between the two apart walls, and
    wherein the inner connection profile includes rectangular corners and the outer connection profile includes rounded corners.

2. The stack of claim 1, wherein the rounded corners have a radius of curvature ranging from 1.0 mm to 2.12 mm.

3. The stack of claim 1, wherein the flow channels define a pair of wall portions.

4. The stack of claim 3, wherein each connecting portion has a first portion coupled to a first wall portion and a second portion coupled to a second wall portion.

5. The stack of claim 4, wherein the rounded corners join the first portion of the outer connection profile to a first wall of one of the apart walls.

6. A stack for a fuel system including at least one electricity generator, the electricity generator having a membrane-electrode assembly and two separators closely contacting the membrane-electrode assembly on two sides, each separator comprising:
    a plurality of flow channels adapted for passing fluids;
    a plurality of first rounded corners and second rounded corners; and
    a plurality of connecting portions coupling the flow channels, each connecting portion having a straight portion between the first rounded corners,
    wherein the flow channels define a pair of wall portions,
    wherein each connecting portion has a first portion coupled to a first wall portion and a second portion coupled to a second wall portion,
    wherein the first rounded corners join the first portion to the first wall and the second rounded corners join the second portion to the second walls,
    wherein a circular arc of the first rounded corners is longer than a circular arc of the second rounded corners.

7. The stack of claim 4, wherein the first wall portion coupled to the first portion of each connecting portion is straight.

8. The stack of claim 4, wherein the second wall portion coupled to the second portion of each connecting portion is straight.

9. The stack of claim 6, wherein the rounded corners have a radius of curvature ranging from 1.0 mm to 2.12 mm.

10. The stack of claim 1, wherein each electricity generator further comprises:
    fuel passages formed by the flow channels of one separator and the side of the membrane-electrode assembly closely in contact with the one separator; and
    air passages formed by the flow channels of other separator and the side of the membrane-electrode assembly closely in contact with the other separator.

11. The stack of claim 1, wherein the stack has a plurality of electricity generators successively stacked next to one another.

12. A stack for a fuel cell system including at least one electricity generator, the electricity generator having a membrane-electrode assembly and two separators closely contacting the membrane-electrode assembly on two sides, each separator comprising:

a plurality of flow channels adapted for passing fluids; and a plurality of connecting portions coupling the flow channels, each connecting portion having a straight portion between rounded corners, wherein at least three adjacent flow channels are coupled together by one of the plurality of connecting portions at a first end of the three adjacent flow channels.

13. The stack of claim 6, wherein the first wall portion coupled to the first portion of each connecting portion is straight.

14. The stack of claim 6, wherein the second wall portion coupled to the second portion of each connecting portion is straight.

* * * * *